US008038591B2

(12) United States Patent
Barnes et al.

(10) Patent No.: US 8,038,591 B2
(45) Date of Patent: Oct. 18, 2011

(54) IMAGE FORMING APPARATUS COMPONENT WITH TRIBOELECTRIC PROPERTIES

(75) Inventors: Jonathan Lee Barnes, Richmond, KY (US); Jenny Marie Berens, Lexington, KY (US); Bhaskar Gopalanarayanan, Lexington, KY (US); Jason Edward Gordon, Nicholasville, KY (US); David Starling MacMillan, Winchester, KY (US); Gregory Lawrence Ream, Lexington, KY (US); Ronald Lloyd Roe, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1210 days.

(21) Appl. No.: 11/691,659

(22) Filed: Mar. 27, 2007

(65) Prior Publication Data

US 2008/0240810 A1 Oct. 2, 2008

(51) Int. Cl.
*F16C 13/00* (2006.01)
*B21K 1/02* (2006.01)

(52) U.S. Cl. ................ 492/59; 492/30; 492/28; 492/48; 399/333

(58) Field of Classification Search .................... 492/59, 492/48, 30, 28; 399/333
See application file for complete search history.

(56) References Cited

U.S. PATENT DOCUMENTS

| | | | | |
|---|---|---|---|---|
| 3,731,146 | A | 5/1973 | Bettiga et al. | |
| 4,656,964 | A | 4/1987 | Kanno et al. | |
| 5,215,846 | A * | 6/1993 | Fuller et al. | 430/108.1 |
| 5,458,937 | A * | 10/1995 | Nakamura et al. | 428/36.91 |
| 5,666,620 | A * | 9/1997 | Kobayashi | 399/273 |
| 5,948,584 | A * | 9/1999 | Hashimoto et al. | 430/109.3 |
| 6,072,975 | A | 6/2000 | Kyung | |
| 6,123,417 | A * | 9/2000 | Bard et al. | 347/55 |
| 6,253,052 | B1 * | 6/2001 | Cornelius et al. | 399/274 |
| 6,319,647 | B1 | 11/2001 | Gutman et al. | |
| 6,360,069 | B1 * | 3/2002 | Mimura et al. | 399/286 |
| 6,711,371 | B2 | 3/2004 | Koyama et al. | |
| 7,727,619 | B2 * | 6/2010 | Okamoto et al. | 428/206 |
| 2005/0154149 | A1 * | 7/2005 | Beach et al. | 525/453 |
| 2006/0233571 | A1 | 10/2006 | Askren et al. | |
| 2006/0275049 | A1 | 12/2006 | Bethel et al. | |

* cited by examiner

*Primary Examiner* — Essama Omgba

(57) ABSTRACT

The present disclosure relates to an image forming device component that includes an elastomeric material having a surface and a triboelectric charging material that may be exposed on the elastomeric material surface. The triboelectric material may be exposed by a finishing process that results in removal of a portion of the material leaving voids in the surface. The surface may have a surface roughness in the range of about 0.1 to 5.0 Ra. The component may include a developer roller in an electrophotograhic printer and may provide contact electrification to a given toner during a printing operation.

22 Claims, 4 Drawing Sheets

IMAGE FORMING APPARATUS COMPONENT WITH TRIBOELECTRIC PROPERTIES

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to triboelectric charging materials as applied to a component of an image forming apparatus. Such components may then improve the transport of image forming material such as toner and may also influence toner charging, toner charge distribution and/or the quality of the printed image.

2. Description of the Related Art

Many image forming devices, such as printers, copiers, fax machines, or multi-functional machines, utilize toner to form images on media or paper. The image forming apparatus may transfer the toner from a reservoir to the media via a developer system utilizing differential charges generated between the toner particles and the various components in the developer system. In particular, one or more toner adder rolls may be included in the developer system, which may transfer the toner from the reservoir to a developer roller. The developer roll may then apply the toner to a selectively charged photoconductive substrate forming an image thereon, which may then be transferred to the media.

SUMMARY OF THE INVENTION

The present disclosure relates to an image forming device component that includes an elastomeric material having a surface and a triboelectric charging material exposed on the elastomeric material surface. The surface may have a surface roughness in the range of about 0.1 to 5.0 micron (μm) Ra. In method form, a triboelectric charging material may be combined with a liquid coating precursor, applied to an image forming device to form a coating. This may then be followed by removal of a portion of the coating to expose a portion of the triboelectric material to again provide a surface roughness in the range of about 0.1 to 5.0 μm Ra.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
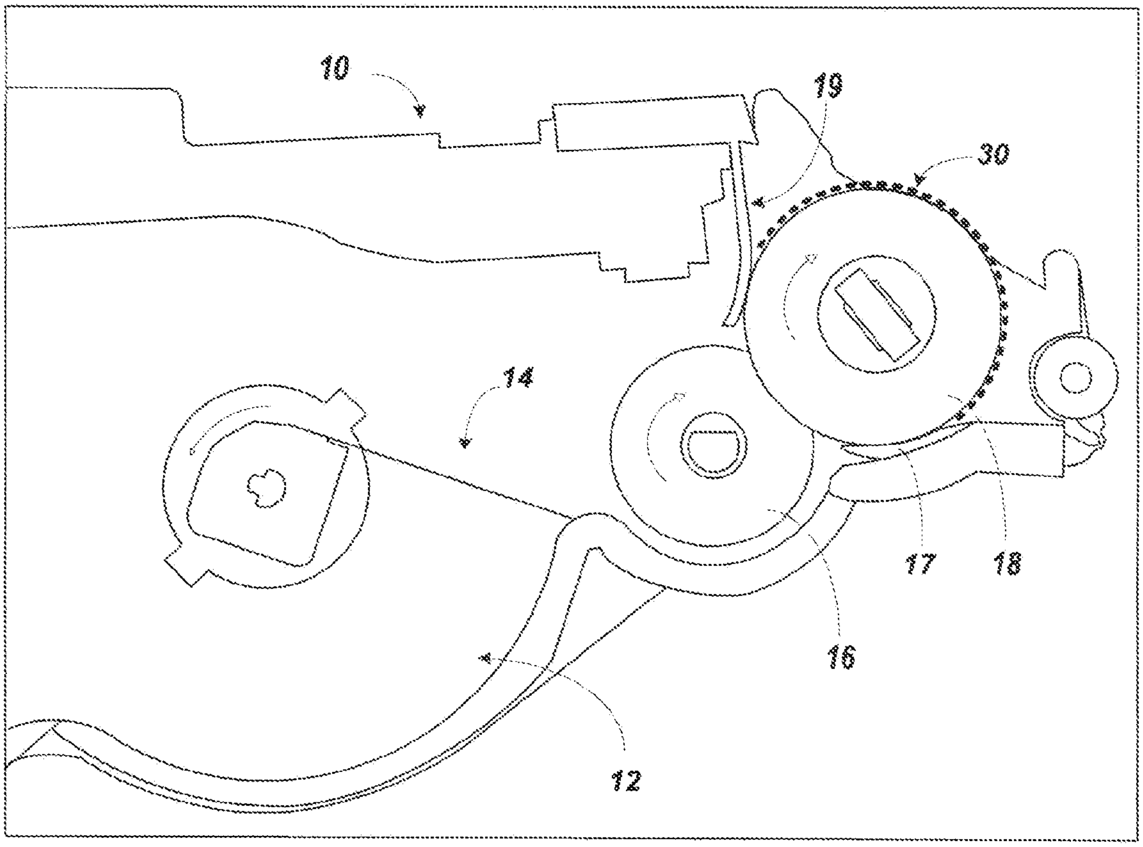
FIG. 1 is a cross-sectional view of an exemplary developer system in an image forming apparatus including a developer roll and/or a toner adder roller.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The present disclosure relates to an image forming apparatus component that utilizes a triboelectric charging material. More specifically, the triboelectric charging material may be employed in a component of the image forming apparatus to charge the image forming material (e.g. toner). A triboelectric charging material herein may therefore be understood as any material associated with a given component that provides for contact electrification wherein a charge may be developed after the component comes into contact with another component in the image forming device. Such contact may therefore include frictional engagement of image forming components that include toner disposed on a surface, such as a developer roller in an electrophotographic printer. Triboelectric charging may therefore result in toner gaining electrons and becoming more negatively charged and/or toner losing electrons and therefore becoming more positively charged.

Toner herein may be understood as any particulate material that may be employed in an electrophotographic (laser) type printer. Toner may therefore include resin, pigments, and various additives, such as wax and charge control agents. The toner may be formulated by conventional practices (e.g. melt processing and grinding or milling) or by chemical processes (i.e. suspension polymerization, emulsion polymerization or aggregation processes.) In addition, the toner may have an average particle size in the range of about 1 to 25 microns (μm), including all values and increments therein. The resins that may be employed in such toners may include polymer or copolymer resins sourced from styrene and acrylate type monomers, as well as polyester based resins. The various pigments which may be included include pigments for producing cyan, black, yellow or magenta toner particle colors.

A variety of components may be present in an image forming device or image forming device cartridge that may be suitable for incorporation of a triboelectric charging material. Such components may therefore include any component that may come in contact with toner and which is capable of generating a triboelectric charge as noted above. This then may include, but not be limited to, a toner addition roller (TAR) or developer roller which may contact with one another, wherein the TAR may be designed to feed or convey toner to the developer roller. A TAR roller may therefore be understood as any component that provides (e.g. transfers) some quantity of toner from a location in the printer or cartridge to a developer roller. The developer roller in turn may then provide toner to a photoconductive (PC) component, such as a PC drum. A developer roller may therefore by understood as any component that provides (feeds or delivers) some amount of toner to a given PC surface. Furthermore, the components herein for incorporation of a triboelectric charging material may also include relatively non-moving components. For example, this may include a doctor blade, which nonetheless engages with toner and undergoes contact with another image forming device component and may therefore be capable of generating a triboelectric charge.

In addition, the components noted above, which may include triboelectric charging material, may also be separately electrically biased to also promote toner transfer via the use of differing potentials, e.g., as between a TAR and developer roller. The toner on the developer roller, as noted, may then be conveyed and applied to the surface of the photoconductor due to a potential difference between the potential areas of the exposed image on the PC drum and the developing potential of the toner on the developer roller.

The triboelectric charging material herein may be sourced from a number of materials. As alluded to above, the materials may, e.g. tend to charge positively (lose electrons) or tend to charge negatively (and gain electrons). Exemplary triboelectric charging material herein may therefore include various polymeric materials. For example, acrylic polymers, which may be understood as polymers containing the following structure:

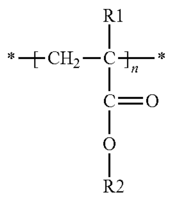

wherein R1 may be a hydrogen, alkyl or aromatic group and R2 may be an alkyl or aromatic group. The alkyl groups and/or aromatic groups may also be substituted, and may therefore include other functional groups, such as halogens, ether groups, hydroxy groups, etc. For example, one suitable acrylic polymer for use herein is poly(methyl methacrylate) (PMMA). Other polymers contemplated herein include polyester resins, e.g. poly(ethylene terephthalate), poly(acrylonitrile), polyamides, cellulosic polymers, melamine and/or halogenated polymers such as poly(vinyl chloride). The triboelectric charging materials herein may also be characterized as those which have an electrical volume resistivity in the range of about $1\times10^{10}$ ohm-cm to $1\times10^{16}$ ohm-cm.

The polymeric material that may be utilized may also be characterized as ones that may include pendant electron donating groups or pendant electron withdrawing groups that may promote contact electrification. By the term "pendant" it may be understood to define a functional group that is attached to a main chain repeat unit of a given polymer. The triboelectric charging material may also beneficially exhibit a relatively low equilibrium moisture uptake, e.g., ≦2.5% by weight. Accordingly, the polymeric triboelectric charging materials may be selected based upon those which indicate a water absorption, as measured by ASTM D570 after 24 hours, in the range of about 0.1 to about 2.5% by weight, including all values and increments therein. Particularly, the polymeric material may exhibit a water absorption in the range of about 0.1 to 0.5% after a 24 hour period as measured by ASTM D570. By way of example, this may again point to the selection of PMMA, which has an ASTM D570 water absorption of ≦0.30%. The selection of a triboelectric charging material with such relatively low moisture uptake may therefore separately improve performance when employed in a given printing device environment.

The triboelectric charging materials may also be in the form of particulate. Such particulate may be in the size range of about 0.1-50 μm, including all values and increments therein. For example, the triboelectric charging material herein may be present in particulate form at a size range between about 1-40 μm, 1-30 μm, etc. In one exemplary embodiment the size range may therefore be in the range of about 10-20 μm. Such size range is reference to the diameter of the particle, i.e. the largest linear dimension through the particle. Furthermore, the triboelectric material may be characterized by a mean particle diameter. Accordingly, with respect to a mean particle diameter, the particles may have a mean diameter by volume of between about 1-15 μm, including all values and ranges therein.

FIG. 1 illustrates in cross-section a portion of an exemplary cartridge 10. The cartridge may include a region 12 for toner and a paddle 14 to assist in conveying toner in the direction of a toner adder roller (TAR) 16 which in turn may be in contact with developer roller 18. A seal may also be provided at 17 as between the developer roller 18 and cartridge housing. As those skilled in the art will appreciate, the developer roller 18 may then be in contact with a photoconductive component, such as a photoconductive PC drum (not shown) such that toner may ultimately be conveyed from region 12 (which may sometimes be referred to as a toner sump) to the PC drum during the printing operation. A doctor blade 19 may also be in contact with the developer roll to assist in regulating toner layer thickness and toner charge on the developer roll. It should therefore now be appreciated that a contact region or "nip" may be present between the: (a) TAR and developer roller; (b) developer roller and PC drum; (c) developer roller and seal; and (d) doctor blade and developer roller. One or more of such exemplary contact regions may therefore provide a suitable location for generation of a triboelectric charge in a given toner. In addition, it is contemplated herein that the area in contact as well as the pressure in the contact region may be adjusted which may then provide a technique to control the quantity of contact electrification due to the presence of a triboelectric charging material.

In addition, and by way of example, a developer roller and PC drum herein may define a contact or nip region of nominally 1.0 mm and range from 0.5-1.5 mm, including all values and increments therein. Such nip region may then extend substantially along the length of the roller, which may be about 22-25 cm for a letter or A4 print width. The total force between developer roll and PC drum may be nominally 4 N and range from 2 to 7.5 N, including all values and increments therein. The pressure at the nip may then be nominally 175 $g/cm^2$ and range from 60-650 $g/cm^2$, including all values and increments therein, which may then be suitable for the contact electrification noted herein. In the case of the contact region or nip that may be formed between a doctor blade and developer roller, such may provide a pressure of nominally 580 $g/cm^2$ and range from 230 $g/cm^2$ up to about 1215 $g/cm^2$, including all values and increments therein. It may also be appreciated that the nip location between the developer roller and toner adder roller (which may be in an opposing rotational configuration) may provide a pressure of about 20 $g/cm^2$ to about 90 $g/cm^2$, including all values and increments therein. It is therefore contemplated herein that the pressure in a contact region suitable to provide contact electrification may be from about 20 $g/cm^2$ to about 1500 $g/cm^2$, including all values and increments therein.

Figure 2:
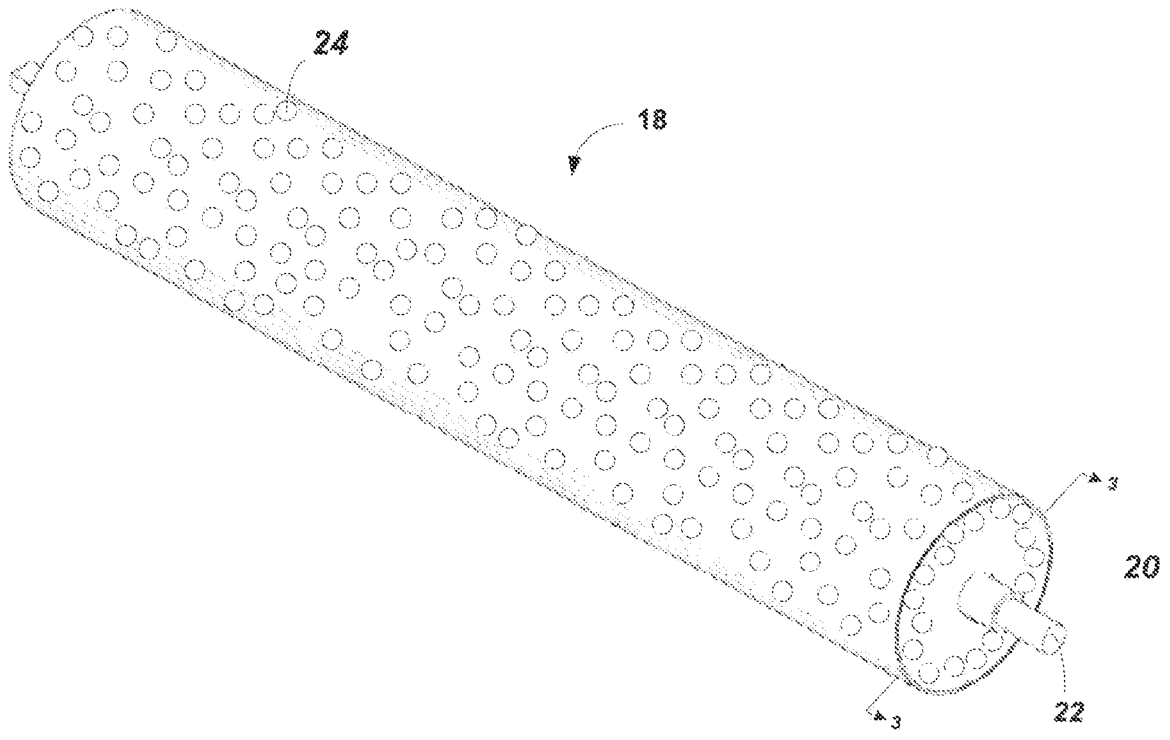
FIG. 2 is a perspective view of an exemplary developer roller or toner adder roller including a tribo-charging material embedded in the surface and near surface of the roller.

FIG. 2 illustrates an exemplary developer roller 18 which may include roller portion 20 and a shaft 22. The shaft may include materials that are either conductive or non-conductive. Conductive material would include metal such as aluminum, aluminum alloys, stainless steel, iron, nickel, copper, etc. Polymeric materials for the shaft may also include polyamide, polyetherimide, etc. The roller portion 20 may be made of a thermoplastic or thermoset elastomeric type material and a surface coating may be applied to the outer surface of the roller 18. Such surface coating may therefore be a resistive type coating. By elastomeric it should also be understood that the material may have a glass transition temperature (Tg) at or below room temperature (about 25° C.), as measured by a differential scanning calorimeter at a heating rate of about 5° C./min, which may be primarily (>50%) amorphous, or in application in, e.g., a printer, the material may substantially recover (>75%) after an applied stress (e.g. a compression type force). The elastomeric material that may be employed for the roller 18 may therefore be any material which provides the ability to elastically deform at a given nip location in the printer while also providing some level of nip pressure (i.e. pressure in the contact region) suitable for contact electrification.

The roller 18 may therefore be made by casting a urethane prepolymer mixed with diol (dihydroxy compound) such as a polydiene diol. The urethane prepolymer may include a polcaprolactone ester in combination with an aromatic isocyanate, such as toluene-diisocyanate. The roller may also contain a filler such as ferric chloride and the polydiene diol may include a polyisoprene diol or polybutadiene diol. The urethane developer roller may therefore be prepared by casting such urethane prepolymer mixed with the polydiene diol, along with a curing agent and filler such as ferric chloride powder, in addition to an antioxidant (e.g. a hindered phenol such as 2,2'-methylenebis (4-methyl-6-tertiarybutyl) phenol or 2,6 di-tertiary-4-methyl phenol. After curing, the roller may then be baked to oxidize the outer surface, which may then be electrically resistive. It is also contemplated herein that with respect to any such casting operation, the triboelectric charging materials may be dispersed in such casting mixtures.

In an exemplary embodiment, the roller 18 may be prepared from Hydrin RTM epichlorohydrin elastomers, available from Zeon Chemicals Incorporated. In yet another exemplary embodiment, the roller 18 may be prepared from silicone, acrylonitrile-butadiene rubber (NBR) or other elastomers available in the market known commonly to those skilled in this field. The roller may then be coated. For example, the roller may be coated with a polyurethane type liquid coating, which may therefore include one type of polyurethane resin or a mixture of such resins. Such polyurethanes may also include moisture cured systems and may be sourced from ester-based polyurethanes formed from aromatic diisocyanates, such as TDI. The urethanes may also include polysiloxane type soft segments, such as a soft segment sourced from a hydroxy-terminated poly(dimthylsiloxane) or PDMS. One exemplary polyurethane coating therefore includes Lord Chemical CHEMGLAZE V022; Chemtura's VIBRATHANE 6060; and Chisso Corporation's Silaplane FMDA21 at a 50-50/5 ratio.

Expanding upon the above, the coating layer on the roller may exhibit an electrical volume resistivity in the range of about $1\times10^8$ ohm-cm to about $1\times10^{13}$ ohm-cm, over a variety of environmental conditions, including all values and increments therein. For example, the electrical volume resistivity may be in the range of about $1\times10^{10}$ ohm-cm to $1\times10^{12}$ ohm-cm at 15.5° C. and 20% relative humidity (RH) or $1\times10^8$ ohm-cm to $1\times10^{10}$ ohm-cm at 15.5° C. and 20% RH. In addition, the roller may exhibit a Shore A hardness in the range of 20 to 80, including all values and increments therein, such as 30 to 50, 40, etc.

The triboelectric charging material may therefore be specifically combined with the liquid coating precursor prior to coating of a given roller. The tribolectric charging material may be combined with the coating precursors at a loading of between about 5-40% by weight, including all values and increments therein. For example, PMMA particulate having a size of between about 10-20 μm may be combined with a polyurethane liquid coating at about a 15-25% loading (wt) and applied to the surface of the roller to provide a coating thickness of about 140 μm. The PMMA particles can be purchased from Soken Chemical and Engineering Co. Ltd. (for instance MX1500-H), or similar grades from other manufacturers. This may then be followed by a finishing operation, in which the surface of the roller may be ground to remove about 30 μm which may then expose all or a portion of the triboelectric particulate material. Such grinding (physical removal of material) may include centerless grinding, wherein the outer diameter of the roller may be adjusted (ground or reduced) to a desired dimension utilizing a grinding wheel, workblade and regulating wheel, wherein the roller is not mechanically constrained. Other grinding operations such as traverse or plunge grinding or sanding operations may be employed as the finishing operation. Sanding operations may be understood as either wet or dry sanding wherein roller material may be removed by the use of sandpaper that may be as wide as the roller which roller may then be loaded against the paper for material removal.

It may therefore be appreciated that for a given roller coating thickness, the finishing operation may remove 5-40% of such coating thickness in order to expose a portion of the triboelectric material. In addition, the roller herein may specifically have a final thickness (surface of shaft 22 to outer roller surface) of equal to or greater than about 3.5 mm. In addition, the thickness may be in the range of about 3.5 mm to 10.0 mm, including all values and ranges therein.

By adjustment of the above referenced coating operation, and ensuing grinding operation, the coating containing particulate triboelectric material may be configured herein to provide that the amount of triboelectric material removed due to grinding still leaves an adequate amount of surface triboelectric material that is sufficient for contact electrification of a selected toner. In such manner it may be appreciated that for a given roller surface area ($SA_R$), the surface area of triboelectric material ($SA_{TM}$) may account for a portion of the roller surface area. For example, the surface area of triboelectric material ($SA_{TM}$) may be equal to about $(0.01\text{-}0.50)\times(SA_R)$, including all values and increments therein. In addition, upon removal of triboelectric material, voids may formed on the roller surface. Accordingly, for a given roller having a surface area ($SA_R$) the roller may also include a plurality of voids having an overall surface area ($SA_V$) wherein $SA_V=(0.02\text{-}0.50)\times(SA_R)$ It may also be appreciated that during a grinding operation, a loss of triboelectric particulate material may lead to a void formation in the roller surface (i.e. the region previously occupied by triboelectric particulate material). For example, in that situation wherein the polyurethane coating liquid contains about 20% by weight loading of a selected triboelectric particulate, the grinding operation may lead to a loss of about 50% or even more of the triboelectric particulate. This may then result in an exposed coating surface area that contains about 10% voids and 10% triboelectric particulate material. More generally, the present disclosure contemplates that about 10%-90% of the triboelectric charging material may be removed from the surface, including all values and increments therein. For example, about 30%-70% may be removed, or about 40%-60%, to provide voids in the surface.

It may therefore now be appreciated that by coating and grinding, a surface may be provided that may have triboelectric charging capability as well as a desired surface finish. Accordingly, a surface roughness of between 0.1 to 5.0 microns Ra may be provided, including all values and increments therebetween. For example, the roller may have Ra values of between about 0.25-1.5 μm. It may be appreciated therefore that Ra can measured using a contact profilometer incorporating a stylus such as a TKL-100 from Hommel-Werke. This stylus has a radius of 5 microns and maintains contact with the surface to be characterized at a force of 0.5 mN. The stylus is dragged across the surface with a trace length of 4.8 mm using a cutoff length of 0.8 mm. The surface profile is plotted and a mean line is generated. The Ra is the average deviation of the true surface from the theoretical mean surface across the assessment length.

Figure 3:
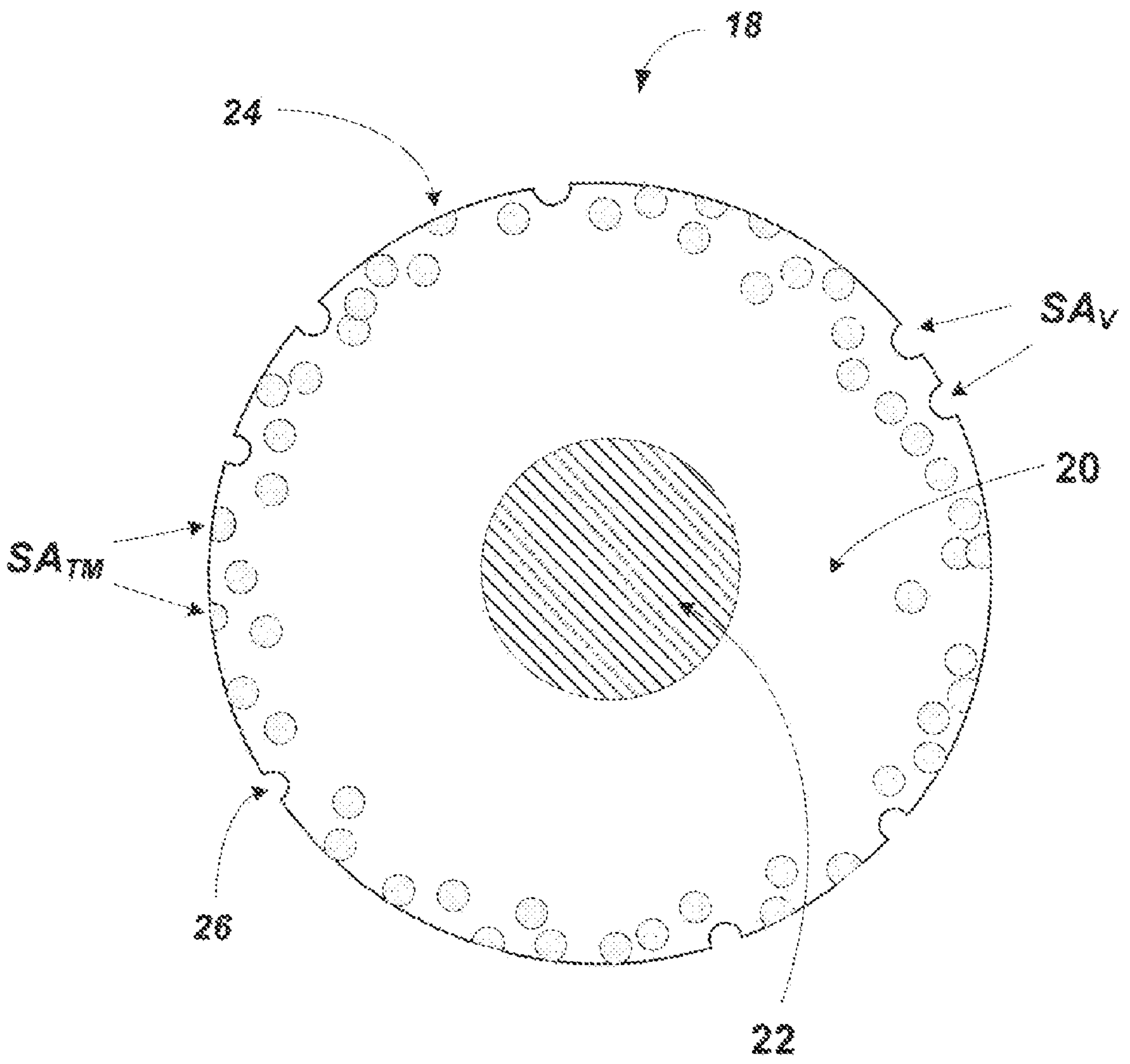
FIG. 3 is a cross sectional view along line 3-3 of the exemplary roller of FIG. 2.

Attention is therefore directed to FIG. 3, which provides a cross-sectional view of an exemplary developer roller 18 including triboelectric charging material 24 in particulate form. As can be seen is this exemplary cross-sectional view, the particulate triboelectric charging material 24 may be exposed on a portion of the exposed roller surface area, which collection of exposed triboelectric particulate will provide a surface area for the triboelectric material ($SA_{TM}$). In addition, voids 26 may be present, which collection of voids will provide a void surface area ($SA_V$) for the roller. The exposed particulate triboelectric material and/or voids may then provide a selected roughness, and as noted above, this may be accomplished by a grinding procedure or it may also be an inherent characteristic of the roller as formed. Furthermore, as noted above, the triboelectric charging material may also be selected such that it is capable of being dispersed in a given liquid coating (organic or aqueous) as well as being chemically reacted and bonded to either the coating resins and/or roller core material 20. For example, one may consider the use of a hydroxyl-terminated acrylic polymer as the triboelectric charging particulate material, in conjunction with a diisocyanate and an appropriate hydroxy-terminated polyol for a coating composition. The polyurethane as formed from such ingredients may therefore include the acrylic triboelectric charging material bonded directly to the polyurethane. This may then control (reduce) the loss of triboelectric material when the roller is mechanically ground to expose a desired percentage of triboelectric material on the roller surface while also achieving a desired surface roughness. In addition, it may also be appreciated that when forming a given roller, the use of a functionalized triboelectric charging material, capable of reacting and bonding to the roller material, will also provide a technique to ensure that the triboelectric material is again less likely to phase separate and be removed, which may then compromise the efficiency of any ensuing contact electrification of toner.

The fraction of triboelectric particles removed from the roller surface may therefore be dependent upon grinding conditions and the adhesion or bonding properties of the particulate in the coating material. In a preferred embodiment, the polyurethane coating liquid contains about 20% by weight loading of Soken Chemical and Engineering Co. Ltd MX1500-H PMMA beads; the grinding operation leads to a loss of about 30-80% of this triboelectric particulate. This then results in an exposed coating surface area ($SA_R$) exhibiting a surface area of voids ($SA_V$) equal to about (0.06-0.16)×($SA_R$) and surface area of PMMA material (0.04-0.14)×($SA_R$). Mean toner particle diameter by volume is about 6.5 μm in this embodiment. In a second preferred embodiment, the polyurethane coating liquid contains about 10% by weight loading of Soken Chemical and Engineering Co. Ltd MX1500-H PMMA 15 μm diameter beads and the grinding operation leads to a loss of about 20-90% of this triboelectric particulate. This then results in an exposed coating surface area ($SA_R$) exhibiting a surface area of voids ($SA_V$) equal to about (0.02-0.09)×($SA_R$) and surface area of PMMA material (0.01-0.08)×($SA_R$). Mean toner particle diameter by volume is about 6.5 μm in this exemplary embodiment.

Figure 4:
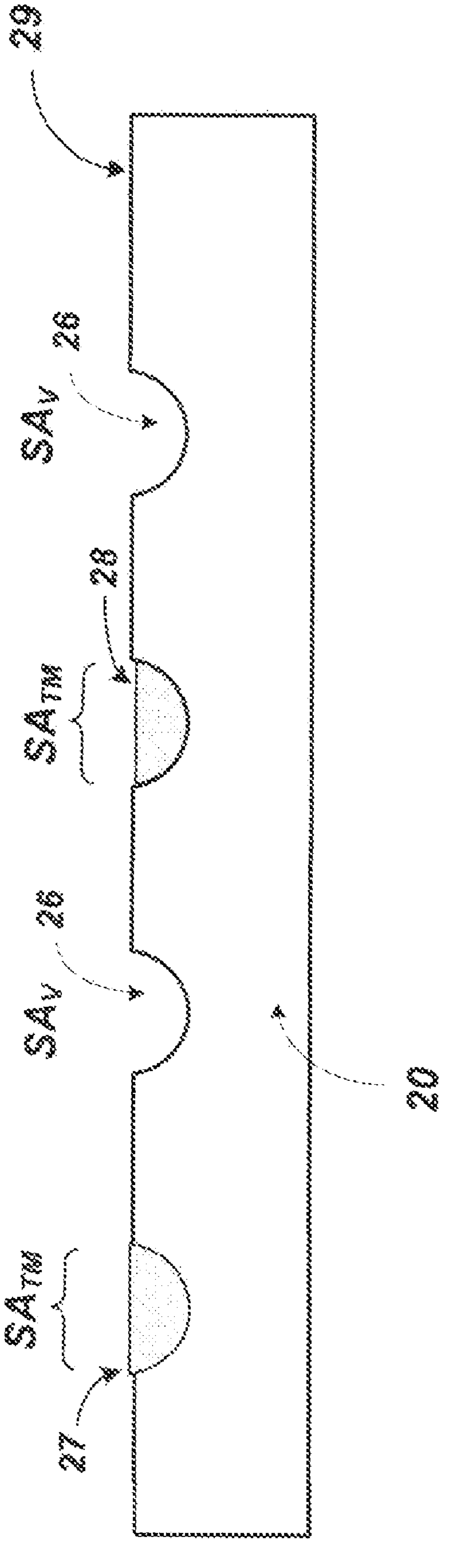
FIG. 4 is a cross-sectional view along the length of a portion of the roller surface of FIG. 2.

FIG. 4 illustrates a cross-sectional view of a portion of the roller surface along the roller length. As can be seen, the roller surface may include triboelectric charging particulate material 24 which particulate material may then ultimately define a surface area ($SA_{TM}$), i.e. each exposure particle contributing to the value of $SA_{TM}$. In addition, in those situations where the triboelectric particulate material may no longer be present, one or more voids 26 may be present, which will all contribute to providing a surface area of voids ($SA_V$). Again, the combination of the triboelectric material 24 and voids 26 may then be controlled to provide a targeted surface finish and expose the triboelectric material to toner.

Toner mass flow on the developer roll may then determined by a combination of the surface roughness imparted by the finishing operation as assessed by a profilometer; and by the fraction of the roller surface area covered by voids ($SA_V$) and triboelectric material ($SA_{TM}$). Referring to FIG. 4, the difference in hardness between the elastomeric roller surface and the triboelectric particulate interacts with the finishing operation to produce a cleaved particulate surface that may be flush, elevated 27 or recessed 28 as compared to the surrounding surface 29. For example, triboelectric material may be elevated or recessed at an amount of greater than 0.50 μm to about 2.50 μm from a given roller surface. Triboelectric material that is flush with the roller surface may be understood as being within +/−0.50 μm or less of the roller surface, i.e. elevated (+) or below (−) the roller surface by the indicated amount. The composite textured surface may then interact with the doctor blade 19 and the toner to produce a toner layer 30 of controlled mass per unit area (M/A). Nominal toner mass per unit area on the developer roller can thus be adjusted by design choices for ($SA_R$), ($SA_V$), ($SA_{TM}$), and finishing conditions that produce a targeted Ra.

In such regard, it may now be appreciated that the triboelectric material herein may provide the ability to more effectively convey toner in a printer by use of electric fields as opposed to mechanical forces. For example, the use of triboelectric charging may provide the opportunity to increase the formation of properly charged toner in a given electrostatic (laser) printing device. That is, it is contemplated herein that the use of a toner adder roller 16 in contact with developer roller 18 containing the above referenced triboelectric charging material may provide toner with a charge increase of up to about 10 microcoulombs/gram (μC/g), including all values and increments therein as compared to a developer roller without the triboelectric particles. Accordingly, the triboelectric charging material in the developer roller 18 may add a charge to toner of between about 1-10 μC/g, or between 5-10 μC/g, etc. The tribo charge imparted to the toner at this nip may then improve the toner addition function by enabling an electric field between the TAR and developer roll to electrostatically drive and adhere this triboelectrically charged toner onto the developer roll.

Expanding upon the above, the triboelectric material herein as applied to the developer roller may be particularly useful to deal with problems due to relatively low charge (e.g.

<20 μC/g) or wrong-sign toner. In such regard, it may be appreciated that an acceptable toner charge may be in the range of about 20-45 μC/g. Such low charge or wrong-sign toner may undesirably be developed and/or sent to the photoconductive drum cleaner, belt cleaner or paper (as background haze), which may be quantified as the variable of "toner to cleaner" or TTC, in units of milligrams per page (mg/page). The value of TTC may therefore be conveniently determined and reliably compared, based upon comparative print jobs wherein there is targeted amount of covered text (e.g 5.0% covered text) at a specified solid area coverage (e.g. about 0.44 $mg/cm^2$ solid area coverage) with respect to a given sample of toner and a given number of toner cleaning components.

Another problem with respect to low charge or wrong-sign toner is doctor blade filming, in which low charge or wrong-sign toner may accumulate on the doctor blade at the doctor blade entry nip, thereby creating a barrier for toner to be uniformly regulated by the doctor blade. Furthermore, "speckles" may be created due to low-charge or wrong-sign toner accumulating on the exit nip of the doctor blade, which may then periodically fall free on to the surface of the developer roller. In this situation, toner accumulation may develop on the PC drum and may appear on a printed page as an objectionable toner spot.

Toner to cleaner (TTC) data was therefore generated on an exemplary roller in accordance with the present disclosure to demonstrate the effectiveness regarding the use of triboelectric charging material and contact electrification of toner as disclosed herein. Accordingly, a developer roller was prepared that employed a urethane coating along with the use of 15 micron PMMA particulate. Specifically, a urethane liquid coating was prepared that contained 20% by weight of PMMA. The urethane liquid coating was, as noted above, made available through the use of Lord Chemical CHEMGLAZE V022; Chemtura's VIBRATHANE 6060; and Chisso Corporation's Silaplane FMDA21 at a 50-50/5 ratio. The roller was then ground to provide a surface finish of Ra=0.5-1.5 microns. The value of TTC was 5 mg/page as compared to 40 mg/page in the absence of the PMMA triboelectric material. It may therefore be appreciated that in the absence of triboelectric charging material as disclosed herein, TTC can reach 10-50 mg/page for a two page print job, exceeding the 12.4 mg/page required to print a 5% coverage text page using toner at approximately 0.44 $mg/cm^2$ solid area coverage.

In another aspect of the doctor blade filming problem, in which low charge or wrong-sign toner may accumulate on the doctor blade at the doctor blade entry nip, the voids created by the partial removal of triboelectric particulate material during a grinding operation (FIG. 4) may serve an additional function of helping to mechanically remove the low charge toner that would otherwise create a barrier for toner to be uniformly regulated by the doctor blade.

The foregoing description of several methods and an embodiment of the invention has been presented for purposes of illustration. It is not intended to be exhaustive or to limit the invention to the precise steps and/or forms disclosed, and obviously many modification and variations are possible in light of the above teaching. It is intended that the scope of the invention be defined by the claims appended hereto.

What is claimed is:

1. An image forming device component comprising an elastomeric material having a surface; and triboelectric charging particles exposed on said elastomeric material surface;

wherein said exposed triboelectric charging particles include:

particles having a cleaved surface elevated at an amount of greater than 0.50 μm to about 2.5 μm from said elastomeric material surface, and particles having a cleaved surface recessed at an amount of greater than 0.50 μm to about 2.5 μm from said elastomeric material surface, wherein said elastomeric material surface with the exposed triboelectric charging particles has a surface roughness in the range of about 0.1 to 5.0 microns Ra.

2. The image forming device component of claim 1 wherein said triboelectric charging particles have a particulate diameter of about 0.10-50 microns.

3. The image forming device component of claim 1 wherein said triboelectric charging particles have an ASTM D570 water absorption of less than or equal to about 2.5%.

4. The image forming device component of claim 1 wherein said elastomeric material surface with the exposed triboelectric charging particles has a surface roughness in the range of about 0.25-1.5 microns Ra, and wherein said triboelectric charging particles have a particulate diameter of about 10-20 microns.

5. The image forming device component of claim 1 wherein said triboelectric charging particles provide a charge to a toner at less than or equal to about 10 microcoulombs/gram.

6. The image forming device component of claim 1 wherein said triboelectric charging particles comprise an acrylic polymer of the following structure:

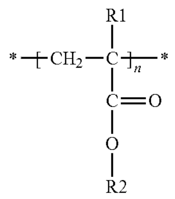

wherein R1 is a hydrogen, alkyl or aromatic group, and R2 is an alkyl group or aromatic group.

7. The image forming device component of claim 1 wherein said elastomeric material has a glass transition temperature (Tg) at or below about 25° C.

8. The image forming device component of claim 1 wherein said elastomeric material comprises a polyurethane material.

9. The image forming device component of claim 1 wherein said component is a developer roller in a printer cartridge.

10. The image forming device component of claim 1 wherein said component is a toner adder roller in a printer cartridge.

11. The image forming device component of claim 1 wherein said exposed triboelectric charging particles include particles having a cleaved surface flush within +/−0.50 μm or less of said elastomeric material surface.

12. The image forming device component of claim 1 wherein said triboelectric charging particles have an electrical volume resistivity in the range of about $1\times10^{10}$ ohm-cm to $1\times10^{16}$ ohm-cm and said elastomeric material has an electrical volume resistivity in the range of about $1\times10^{8}$ ohm-cm to $1\times10^{13}$ ohm-cm.

13. The image forming device component of claim 1 wherein said elastomeric material having a surface forms a roller having a surface area ($SA_R$) and said exposed surface of triboeletric charging particles on said roller has a surface area ($SA_{TM}$) wherein $SA_{TM}$=(0.01-0.50)×($SA_R$).

14. The image forming device component of claim 1 wherein said elastomeric material having a surface forms a roller having a surface area ($SA_R$) and said roller includes voids having a surface area ($SA_v$) wherein $SA_v$=(0.02-0.50)×($SA_R$).

15. An image forming device component comprising an elastomeric material having a surface; and triboelectric charging particles exposed on said elastomeric material surface, wherein said exposed triboelectric charging particles include:

particles having a cleaved surface elevated at an amount of greater than 0.50 μm to about 2.5 μm from said elastomeric material surface, and particles having a cleaved surface recessed at an amount of greater than 0.50 μm to about 2.5 μm from said elastomeric material surface, wherein said elastomeric material surface with the exposed triboelectric charging particles has a surface roughness in the range of about 0.1 to 5.0 microns Ra, wherein said triboelectric charging particles comprise an acrylic polymer of the following structure:

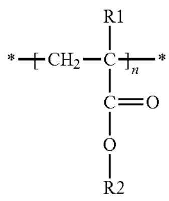

wherein R1 is a hydrogen, alkyl or aromatic group, and R2 is an alkyl group or aromatic group, and wherein said triboelectric charging particles have a particulate diameter of about 0.10-50 microns.

16. The image forming device component of claim 15 wherein said elastomeric material surface with the exposed triboelectric charging particles has a surface roughness in the range of about 0.25-1.5 microns Ra and said triboelectric charging particles have a particulate diameter of about 10-20 microns.

17. The image forming device component of claim 15 wherein said triboelectric charging particles provide a charge to a toner at less than or equal to about 10 microcoulombs/gram.

18. The image forming device component of claim 15 wherein said elastomeric material has a glass transition temperature (Tg) at or below about 25° C.

19. The image forming device component of claim 15 wherein said elastomeric material comprises a polyurethane material.

20. The image forming device component of claim 15 wherein said component is a developer roller in a printer cartridge.

21. The image forming device component of claim 15 wherein said elastomeric material having a surface forms a roller having a surface area ($SA_R$) and said exposed surface of triboeletric charging particles on said roller has a surface area ($SA_{TM}$) wherein $SA_{TM}$=(0.01-0.50)×($SA_R$).

22. The image forming device component of claim 15 wherein said elastomeric material having a surface forms a roller having a surface area ($SA_R$) and said roller includes voids having a surface area ($SA_v$) wherein $SA_v$=(0.02-0.50)×($SA_R$).

* * * * *